United States Patent
Wilson

(10) Patent No.: US 9,855,460 B2
(45) Date of Patent: Jan. 2, 2018

(54) EXERCISE BAR DEVICE

(71) Applicant: M. C. Wilson, Marburg (DE)

(72) Inventor: M. C. Wilson, Marburg (DE)

(*) Notice: Subject to any disclaimer, the term of this patent is extended or adjusted under 35 U.S.C. 154(b) by 0 days.

(21) Appl. No.: 15/042,304

(22) Filed: Feb. 12, 2016

(65) Prior Publication Data

US 2017/0072247 A1   Mar. 16, 2017

Related U.S. Application Data

(60) Provisional application No. 62/219,175, filed on Sep. 16, 2015.

(51) Int. Cl.
*A63B 15/02* (2006.01)
*A63B 21/00* (2006.01)
(Continued)

(52) U.S. Cl.
CPC .... *A63B 21/4035* (2015.10); *A63B 21/00065* (2013.01); *A63B 21/072* (2013.01); *A63B 23/03525* (2013.01); *A63B 23/1209* (2013.01); *G01C 22/006* (2013.01); *G08B 3/10* (2013.01); *A63B 21/4009* (2015.10); *A63B 23/0205* (2013.01); *A63B 23/03575* (2013.01); *A63B 23/0405* (2013.01); *A63B 71/0622* (2013.01); *A63B 2023/003* (2013.01); *A63B 2023/006* (2013.01); *A63B 2071/0625* (2013.01); *A63B 2207/02* (2013.01); *A63B 2220/17* (2013.01); *A63B 2225/50* (2013.01);
(Continued)

(58) Field of Classification Search
CPC .......... A63B 21/0724; A63B 21/00065; A63B 71/0622; A63B 71/4035; A63B 2071/0625; A63B 24/0062; A63B 23/12
See application file for complete search history.

(56) References Cited

U.S. PATENT DOCUMENTS 3,820,781 A * 6/1974 Kane .................. A63B 21/0004
473/227
4,274,628 A * 6/1981 Hoagland .......... A63B 21/0724
482/106
(Continued)

OTHER PUBLICATIONS

Gyroscope and Accelerometer of a phone used as a Pedometer Archived: May 27, 2013 Retrieved: Jan. 10, 2016 Website: http://stackoverflow.com/questions/16772950/counting-steps-using-accelerometer-or-gyroscope.*

*Primary Examiner* — Loan H Thanh
*Assistant Examiner* — Megan Anderson
(74) *Attorney, Agent, or Firm* — Global Intellectual Property Agency, LLC; Daniel Enea

(57) ABSTRACT

An exercise bar for use when exercising, such as while walking, running, jogging, stretching, or the like. The exercise bar device includes a U-shaped frame having a pair of handles extending from opposing sides thereof. The user can position his or her body in the opening defined by the U-shaped frame while holding the frame in various positions with the handles located on side of the user. Each handle is further configured to removably receive a weighted plate thereon for providing additional resistance. In some embodiments, the exercise bar includes an audio unit adapted to allow the user to play music or other audio while exercising. The U-shaped frame further includes a storage compartment, one or more lights, a panic alarm, and a pedometer, depending upon the embodiment.

10 Claims, 3 Drawing Sheets

(51) Int. Cl.
*A63B 21/072* (2006.01)
*A63B 23/035* (2006.01)
*G01C 22/00* (2006.01)
*A63B 23/12* (2006.01)
*G08B 3/10* (2006.01)
*A63B 71/06* (2006.01)
*F21V 33/00* (2006.01)
*F21Y 115/10* (2016.01)
*A63B 23/02* (2006.01)
*A63B 23/04* (2006.01)
*A63B 23/00* (2006.01)

(52) U.S. Cl.
CPC ..... *A63B 2225/687* (2013.01); *F21V 33/0064* (2013.01); *F21Y 2115/10* (2016.08)

(56) References Cited

U.S. PATENT DOCUMENTS

| | | | |
|---|---|---|---|
| 4,863,158 A * | 9/1989 | Tassone | A63B 21/0004 |
| | | | 482/106 |
| D348,706 S | 7/1994 | Harrell | |
| D425,151 S | 5/2000 | Landfair | |
| 7,108,636 B1 | 9/2006 | Garcia | |
| D682,955 S | 5/2013 | Stephan | |
| 2006/0105890 A1* | 5/2006 | Logue | A63B 21/0724 |
| | | | 482/106 |
| 2014/0094347 A1 | 4/2014 | Orakwusi | |
| 2014/0295983 A1* | 10/2014 | Nooner | A63B 69/36 |
| | | | 473/223 |
| 2015/0224381 A1* | 8/2015 | Rodriguez | A63B 69/0002 |
| | | | 473/457 |
| 2016/0228738 A1* | 8/2016 | Tansil | A63B 21/075 |

* cited by examiner

EXERCISE BAR DEVICE

CROSS REFERENCE TO RELATED APPLICATION

This application claims the benefit of U.S. Provisional Application No. 62/219,175 filed on Sep. 16, 2015. The above identified patent application is herein incorporated by reference in its entirety to provide continuity of disclosure.

BACKGROUND OF THE INVENTION

Field of the Invention

The present invention relates to fitness equipment. More specifically, the present invention provides an exercise bar for use when exercising, such as when walking, jogging, running, stretching, or the like.

Exercise bars are commonly used in order to perform a variety of fitness related activities. Exercise bars generally comprise an elongated cylindrical bar having a fixed weight. Conventional exercise bars provide little functionality and cannot be adjusted in weight, requiring the user to switch between exercise bars of various weights depending upon the exercise desired to be performed. Further, the exercise bar may be awkward or difficult to hold in some situations since the exercise bar has a linear configuration. Thus, an improved exercise bar that is easier to hold and that provides additional functionality is desired.

Devices have been disclosed in the prior art that relate to exercise bars. These include devices that have been patented and published in patent application publications. These devices generally relate to exercise bar devices, such as U.S. Design Pat. No. D425151 and U.S. Pat. No. 7,108,636. Other devices relate to door mounted exercise bars for use in performing pullups such as U.S. Published Patent Application Number 2014/0094347, U.S. Design Pat. No. D348706, and U.S. Design Pat. No. D682955.

These prior art devices have several known drawbacks. The devices in the prior art relate to exercise bars, however, such bars are not adapted for use in performing a variety of exercises, such as walking, jogging, running, and stretching, among others. The exercise bars in the prior art further do not provide additional functionality and fail to provide audio units, storage compartments, a panic alarm, and/or lights.

In light of the devices disclosed in the prior art, it is submitted that the present invention substantially diverges in design elements from the prior art and consequently it is clear that there is a need in the art for an improvement to existing fitness devices for use while walking, jogging, running, or stretching. In this regard the instant invention substantially fulfills these needs.

SUMMARY OF THE INVENTION

In view of the foregoing disadvantages inherent in the known types of exercise devices now present in the prior art, the present invention provides a new exercise bar device wherein the same can be utilized for providing convenience for the user when performing fitness related activities, such as walking, jogging, running, or stretching.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
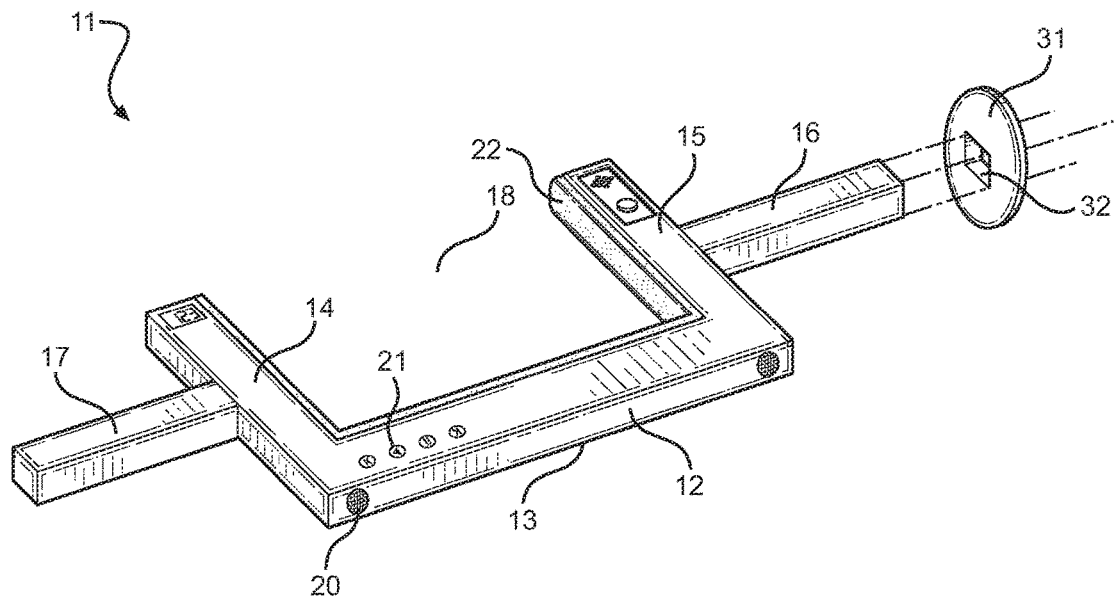
FIG. 1 shows a front view of the exercise bar device.

Reference is made herein to the attached drawings. Like reference numerals are used throughout the drawings to depict like or similar elements of the exercise bar device. For the purposes of presenting a brief and clear description of the present invention, the preferred embodiment will be discussed as used for helping a user to perform a variety of exercises and helping to stabilize the user while stretching or exercising. The figures are intended for representative purposes only and should not be considered to be limiting in any respect.

Figure 2:
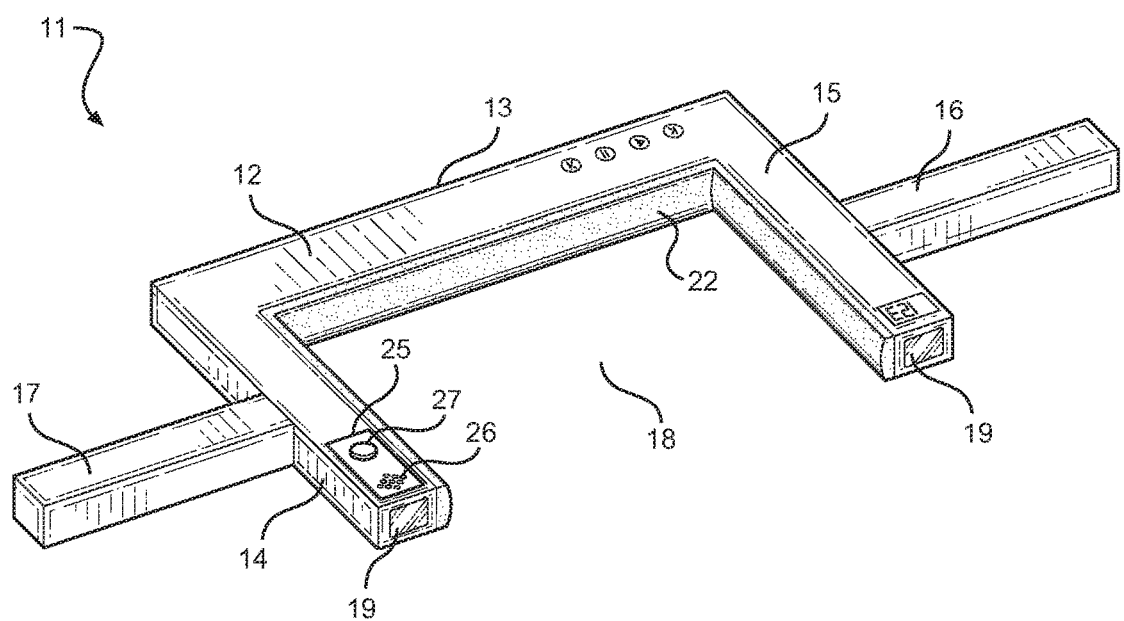
FIG. 2 shows a rear view of the exercise bar device.

Referring now to FIGS. 1 and 2, there are shown front and rear views of the exercise bar device. The exercise bar device 11 comprises a U-shaped frame 12 having a pair of handles 16, 17 extending from opposing sides thereof. The U-shaped frame 12 defines an open central area 18 in which a user can position his or her body, while holding a handle 16, 17 in each hand. In this way, the user can hold the handles 16, 17 at the user's sides, and can rest the U-shaped frame 12 against the user's lower back to provide additional support. However, depending on the activity being performed, the user may hold the exercise bar 11 in any of a variety of positions.

The U-shaped frame 12 comprises a center rod 13 having a first end and a second end, wherein a first side rod 14 is connected to the first end of the center rod 13 and a second side rod 15 is connected to the second end of the center rod 13. Preferably, the first side rod 14 and the second side rod 15 are perpendicular to the center rod 13 and are substantially parallel to one another, so as to form a U-shaped frame 12. In alternate embodiments, the U-shaped frame 12 comprises a single rounded or curved rod so as to have a semi-circular shape. The U-shaped frame 12 further includes padding 22 on an interior surface thereof such that when a user is standing within the open central area 18 defined by the U-shaped frame 12, the user's body rests against the padding 22 so as to provide comfort to the user.

A first handle 17 extends perpendicularly from the first side rod 14. Similarly, a second handle 16 extends perpendicularly from the second side rod 15. The first handle 17 and the second handle 16 are preferably collinear. The handles 16, 17 are permanently affixed to the U-shaped frame 12 or are integrally connected thereto such that the exercise bar device 11 has a unitary body.

The handles 16, 17 are adapted to removably receive one or more weighted plates 31 thereon. The weighted plates 31 preferably have a central opening 32 thereon that is sized so as receive the handle 16, 17 therethrough. In this way, the user can interchangeably position one or more weighted plates 31 on the handles 16, 17 in order to adjust the weight of the exercise bar device 11. This allows the user to provide additional resistance as desired, without requiring the user to utilize a separate exercise bar device 11.

The exercise bar device 11 further comprises an audio unit. The audio unit comprises one or more speakers 20 and one or more controls 21 for operating the audio unit. The audio unit allows the user to play music, sounds, recordings, lectures, or any of various types of audio thereon for the user's enjoyment while exercising. This eliminates the need for the user to exercise with a separate audio player, such as an mp3 player, among others. The audio unit may further include a memory for storage of audio files, and may include a wireless transceiver for wirelessly connecting to electronic mobile devices, such as smartphones, tablets, and the like.

In some embodiments, the exercise bar device 11 comprises a panic alarm 25. The panic alarm 25 comprises a control 27 that can be operated by the user to cause the panic alarm 25 to produce a loud tone, siren, or sound which is played via a speaker 26 on the panic alarm 25. In some embodiments, the panic alarm 25 is combined with the audio unit so that the alarm is played via the speakers of the audio unit. The user can operate the panic alarm 25 to produce a loud sound in the event that the user is attacked or assaulted while he or she is exercising. The loud sound helps to draw attention to the user and potentially scare off an attacker.

In some embodiments, the exercise bar device 11 further comprises one or more light sources 19 thereon. Preferably, the light sources 19 are positioned on the ends of the first side bar 14 and the second side bar 15 so as to provide forward illumination when the user is utilizing the exercise bar device 11. The light sources 19 may include one or more LEDs. The light sources 19 help to illuminate the area directly in front of the user so as to improve the user's visibility.

Figure 3:
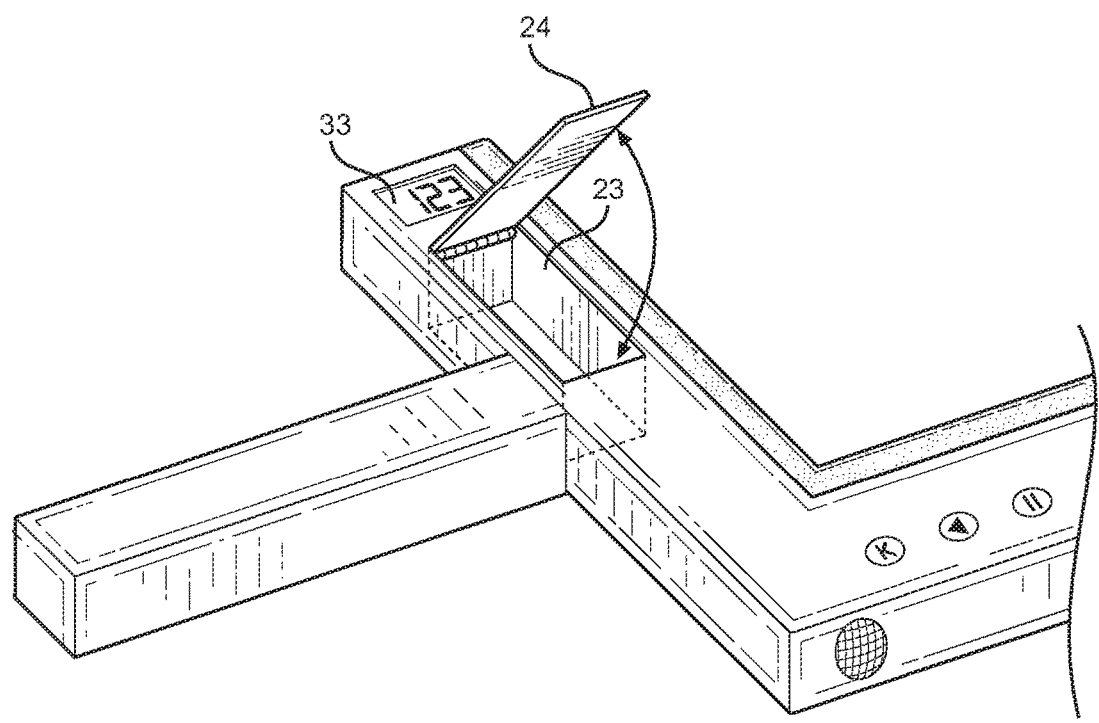
FIG. 3 shows a close-up view of a portion of the exercise bar device.

Referring now to FIG. 3, there is shown a close-up view of a portion of the exercise bar device. In alternate embodiments, the exercise bar device 11 comprises one or more storage compartments 23 thereon. Preferably, the storage compartments 23 are disposed within the U-shaped frame 12. The storage compartments 23 allow the user to store small items, such as keys, money, or the like within the exercise bar device 11. Each storage compartment 23 includes a lid 24 pivotally affixed thereto, wherein the lid 24 can be moved between an open and closed position.

In other embodiments, the exercise bar device 11 further comprises a pedometer 33 therein. The pedometer 33 helps to keep track of the user's steps while the user is utilizing the exercise bar device 11. This helps the user to monitor his or her fitness habits and allows the user to perform an exercise or fitness routine consistently. In some embodiments, the exercise bar device 11 includes a wireless transceiver adapted to allow a user to sync his or her mobile electronic device, such as a smartphone or tablet computer with the exercise bar device 11. The wireless transceiver allows the exercise bar device 11 to communicate fitness information to the mobile electronic device, such as the number of steps taken by the user as determined by the pedometer 33.

Figure 4:
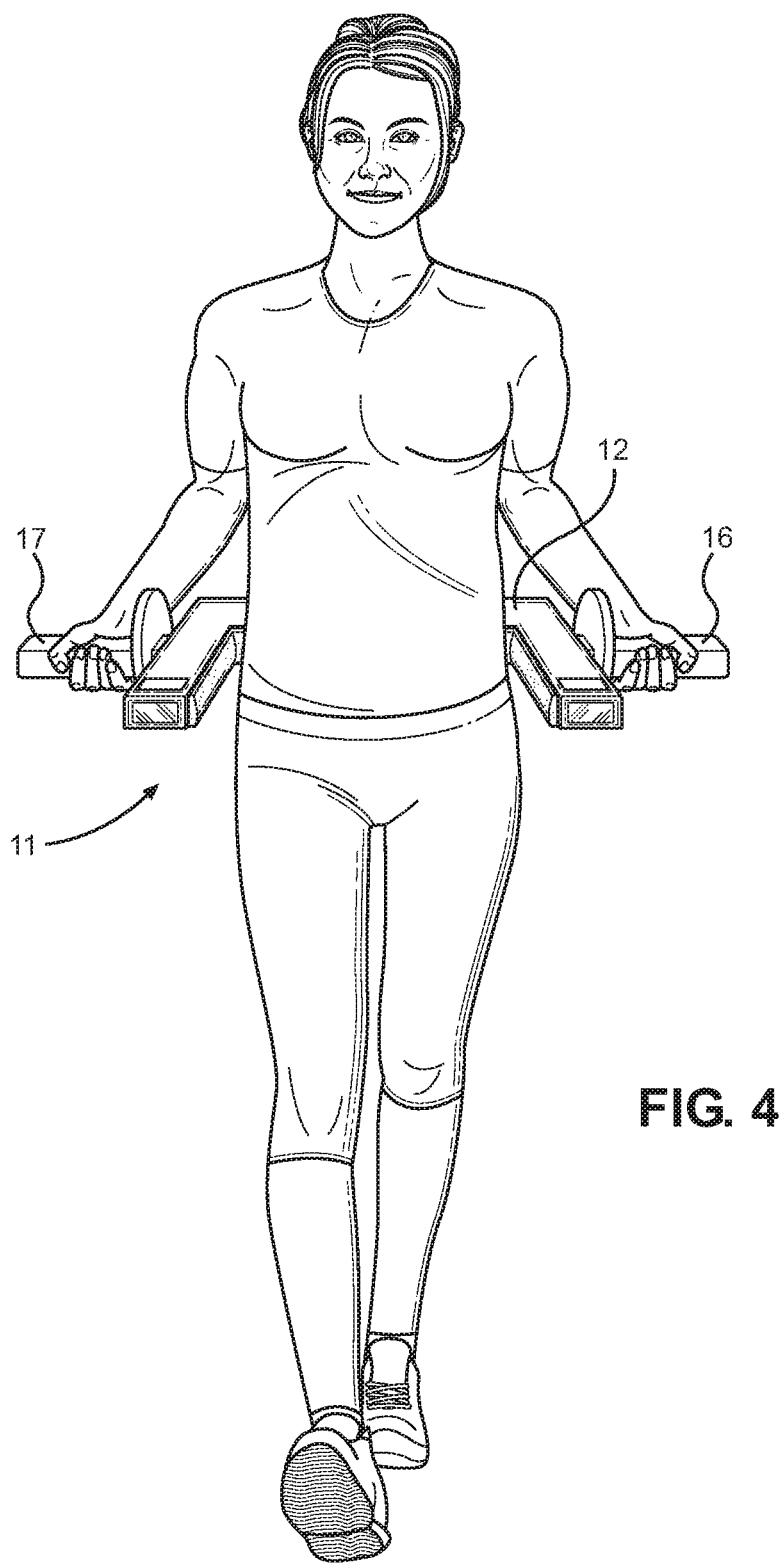
FIG. 4 shows a perspective view of the exercise bar device in use.

Referring now to FIG. 4, there is shown a perspective view of the exercise bar device 11 in use. The exercise bar device 11 can be used so as to perform a wide variety of exercises, such as walking, jogging, running, stretching and strength training as desired by the user. It is not desired to limit the exercise bar device 11 to specific exercises or stretches, but only to provide examples of the numerous ways in which the exercise bar device can be utilized.

In a first position, the user can position his or her body in the open central area defined by the U-shaped frame 12. In this position, the handles 16, 17 extend outward from the opposing sides of the user's body. The user can grasp a handle 16, 17 in each hand. The user may position the center rod of the U-shaped frame against his or her lower back for support. The exercise bar device 11 helps to preserve the user's posture throughout exercise, and also helps to provide a desired level of resistance, depending upon the weight plates utilized. In the first position, the user can rotate his or her torso from side to side in order to exercise the abdominal muscles, particularly the oblique abdominal muscles. Alternately, the user may walk, perform lunges, or perform any of various additional exercises or stretches.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An exercise bar device, comprising:
a center rod having a first side rod connected to a first end of the center rod and a second side rod connected to a second end of the center rod;
wherein the first side rod and the second side rod are perpendicular to the center rod and parallel to each other, forming a U-shaped frame;
a first handle extending perpendicular from a first lateral side of the first side rod and a second handle extending perpendicular from a second lateral side of the second side rod;
wherein each of the first handle and the second handle extends intermediate a pair of ends of the each of the respective first side rod and second side rod;
wherein the first handle and the second handle are collinear;
wherein each of the first handle and the second handle are adapted to removably receive one or more weighted plates thereon; and
an audio unit disposed within the U-shaped frame and adapted to play audio.

2. The exercise bar device of claim 1, wherein the audio unit comprises one or more speakers and one or more controls adapted to control operation of the audio unit.

3. The exercise bar device of claim 2, wherein the audio unit further comprises a panic alarm having a control and a speaker, wherein the panic alarm is adapted to produce an audible alarm when the control is actuated.

4. The exercise bar device of claim 1, further comprising one or more light sources on the U-shaped frame.

5. The exercise bar device of claim 4, wherein the one or more light sources are disposed on the ends of each of the respective first side rod and second side rod.

6. The exercise bar device of claim 1, further comprising a pedometer on said U-shaped frame.

7. The exercise bar device of claim 1, further comprising a storage compartment on the U-shaped frame.

8. The exercise bar device of claim 1, wherein the U-shaped frame comprises an open central area in which a user can position a body of the user such that the first handle and the second handle extend outwardly on opposing sides of the body of the user.

9. The exercise bar device of claim 1, further comprising one or more weighted plates, wherein the weighted plates have a central opening through which the first handle or the second handle can be inserted.

10. The exercise bar device of claim 1, further comprising padding disposed on an interior surface of the U-shaped frame.

* * * * *